United States Patent
Asanghanwa et al.

(10) Patent No.: US 11,573,778 B2
(45) Date of Patent: *Feb. 7, 2023

(54) SECURE DEVICE-BOUND EDGE WORKLOAD DELIVERY

(71) Applicant: Microsoft Technology Licensing, LLC, Redmond, WA (US)

(72) Inventors: Eustace Ngwa Asanghanwa, Kirkland, WA (US); Mahesh Sham Rohera, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,777

(22) Filed: Aug. 2, 2021

(65) Prior Publication Data
US 2021/0357197 A1 Nov. 18, 2021

Related U.S. Application Data

(63) Continuation of application No. 16/132,174, filed on Sep. 14, 2018, now Pat. No. 11,106,441.

(51) Int. Cl.
*G06F 21/57* (2013.01)
*H04L 9/08* (2006.01)
(Continued)

(52) U.S. Cl.
CPC .......... *G06F 8/60* (2013.01); *G06F 21/53* (2013.01); *G06F 21/57* (2013.01); *H04L 9/0866* (2013.01); *H04L 9/0897* (2013.01); *H04L 67/34* (2013.01)

(58) Field of Classification Search
CPC ......... G06F 8/60; G06F 21/57; H04L 9/0866; H04L 9/0869
See application file for complete search history.

(56) References Cited

U.S. PATENT DOCUMENTS 8,566,838 B2 10/2013 Sabin et al.
8,719,590 B1 5/2014 Fabish et al.
(Continued)

FOREIGN PATENT DOCUMENTS

| CN | 104468458 A | 3/2015 |
| WO | 2016032975 A1 | 3/2016 |
| WO | 2018112482 A1 | 6/2018 |

OTHER PUBLICATIONS

Borkar, Paresh, "Shift From The Cloud To The Edge", Retrieved from https://www.gslab.com/shifting-toedge-computing/, Dec. 12, 2017, 5 Pages.
(Continued)

*Primary Examiner* — Viral S Lakhia
(74) *Attorney, Agent, or Firm* — Holzer Patel Drennan

(57) ABSTRACT

The disclosed technology provides for packaging a secure cloud workload at a workload provisioning service. A unique device identifier is received from an edge device. The unique identifier is associated with the edge device. A unique packaging key is cryptographically generated based on the received unique device identifier, a unique workload identifier corresponding to a secure cloud workload to be executed on the edge device, and a nonce. The secure cloud workload is encrypted to generate a packaged secure cloud workload using the cryptographically generated unique packaging key. The encrypted secure cloud workload is transmitted to the edge device. The edge device is capable of independently cryptographically generating the unique packaging key using the unique device identifier, the unique workload identifier, and the nonce. The edge device is also capable of decrypting the packaged secure cloud workload using the generated unique packaging key cryptographically generated by the edge device.

20 Claims, 6 Drawing Sheets

(51) Int. Cl.
  *H04L 67/00* (2022.01)
  *G06F 8/60* (2018.01)
  *G06F 21/53* (2013.01)

(56) References Cited

U.S. PATENT DOCUMENTS

| | | | |
|---|---|---|---|
| 8,745,390 B1 | 6/2014 | Atwood et al. | |
| 9,578,063 B1 | 2/2017 | Iyer et al. | |
| 9,754,115 B2 | 9/2017 | Bodis et al. | |
| 9,825,954 B2 | 11/2017 | Zou et al. | |
| 9,928,080 B2 | 3/2018 | Boenisch et al. | |
| 10,057,113 B2 | 8/2018 | Sabin et al. | |
| 10,476,906 B1 | 11/2019 | Siddiqui | |
| 11,074,198 B2* | 7/2021 | Wallach | G06F 12/1475 |
| 11,106,441 B2* | 8/2021 | Asanghanwa | G06F 21/57 |
| 11,226,867 B2* | 1/2022 | Richards | G06F 9/45558 |
| 2002/0019932 A1* | 2/2002 | Toh | H04L 63/061 |
| | | | 713/155 |
| 2007/0283170 A1 | 12/2007 | Yami et al. | |
| 2008/0065894 A1* | 3/2008 | Wang | H04L 9/083 |
| | | | 713/176 |
| 2012/0159610 A1* | 6/2012 | Backes | G06F 12/1433 |
| | | | 710/22 |
| 2012/0300940 A1 | 11/2012 | Sabin et al. | |
| 2013/0212576 A1 | 8/2013 | Huanq et al. | |
| 2014/0044259 A1* | 2/2014 | Funayama | G06F 21/602 |
| | | | 380/243 |
| 2014/0096182 A1 | 4/2014 | Smith | |
| 2015/0229619 A1 | 8/2015 | Costa et al. | |
| 2016/0092687 A1 | 3/2016 | Boenisch et al. | |
| 2017/0063975 A1 | 3/2017 | Prakash et al. | |
| 2017/0289184 A1 | 10/2017 | C et al. | |
| 2017/0302459 A1 | 10/2017 | Fenner et al. | |
| 2017/0323114 A1 | 11/2017 | Egorov et al. | |
| 2017/0359170 A1 | 12/2017 | Bower et al. | |
| 2018/0019983 A1 | 1/2018 | Tissot et al. | |
| 2018/0048464 A1 | 2/2018 | Lim et al. | |
| 2018/0048470 A1 | 2/2018 | Bower et al. | |
| 2018/0191718 A1 | 7/2018 | Kuzkin et al. | |
| 2018/0254901 A1 | 9/2018 | Egorov et al. | |
| 2019/0042764 A1 | 2/2019 | Durham et al. | |
| 2019/0087588 A1 | 3/2019 | Baboval et al. | |
| 2019/0102322 A1 | 4/2019 | Chhabra et al. | |
| 2019/0132308 A1 | 5/2019 | Graham et al. | |
| 2019/0173518 A1* | 6/2019 | Ataie | H04B 1/70754 |
| 2019/0297064 A1 | 9/2019 | Resch et al. | |
| 2020/0089481 A1 | 3/2020 | Asanghanwa et al. | |
| 2020/0092263 A1 | 3/2020 | Rohera et al. | |
| 2020/0159676 A1* | 5/2020 | Durham | G06F 9/5016 |
| 2020/0186971 A1* | 6/2020 | Knebl | H04W 4/029 |
| 2022/0166586 A1* | 5/2022 | Kun | H04L 5/0037 |

OTHER PUBLICATIONS

Zhang, et al., "Data Security and Privacy-Preserving in Edge Computing Paradigm: Survey and Open Issues" In Journal of IEEE Access, vol. 6, Mar. 28, 2018, pp. 18209-18237.

Gremban, Kelly, "What is Azure IoT Edge", Retrieved from https://docs.microsoft.com/en-us/azure/iotedge/about-iot-edge, Jun. 12, 2018, 3 Pages.

"Manage devices using LWM2M", Retrieved from https://developer.artik.cloud/documentation/devicemanagement/manage-devices-using-lwm2m.html, Retrieved on Jun. 29, 2018, 13 Pages.

International Search Report and Written Opinion Issued In PCT Patent Application No. PCT/US19/038842 dated Aug. 6, 2019, 12 Pages.

"International Search Report and Written Opinion Issued in PCT Application No. PCT/US2019/038839", dated Sep. 18, 2019, 13 Pages.

Non Final Office Action Issued in U.S. Appl. No. 16/132,227, dated Jun. 16, 2020, 14 Pages.

"Non Final Office Action Issued in U.S. Appl. No. 16/132,174", dated Oct. 28, 2020, 23 Pages.

"Final Office Action Issued In U.S. Appl. No. 16/132,227", dated Feb. 10, 2021, 14 Pages.

Notice of Allowance Issued in U.S. Appl. No. 16/132,174, dated Apr. 16, 2021, 17 Pages.

"Non Final Office Action Issued in U.S. Appl. No. 16/132,227", dated Dec. 29, 2021, 15 Pages.

"Non Final Office Action Issued in U.S. Appl. No. 16/132,227", dated Aug. 11, 2022, 18 Pages.

* cited by examiner

SECURE DEVICE-BOUND EDGE WORKLOAD DELIVERY

CROSS-REFERENCE TO RELATED APPLICATIONS

The present application is a Continuation of and claims benefit of priority to U.S. patent application Ser. No. 16/132,174, filed Sep. 14, 2018, entitled "SECURE DEVICE-BOUND EDGE WORKLOAD DELIVERY" which is specifically incorporated by reference for all that it discloses and teaches.

The present application is related to U.S. patent application Ser. No. 16/132,227, entitled "SECURE DEVICE-BOUND EDGE WORKLOAD RECEIPT," filed Sep. 14, 2018 and is specifically incorporated by reference for all that it discloses and teaches.

BACKGROUND

Moving some aspects of workload execution, such as artificial intelligence modules, from the cloud to edge devices can improve workload execution speed and can allow for execution of a workload without a connection to the cloud. However, the workload may not be as secure on the edge device as on the cloud.

SUMMARY

In at least one implementation, the disclosed technology provides for packaging a secure cloud workload at a workload provisioning service. A unique device identifier is received from an edge device. The unique identifier is associated with the edge device. A unique packaging key is cryptographically generated based on the received unique device identifier, a unique workload identifier corresponding to a secure cloud workload to be executed on the edge device, and a nonce. The secure cloud workload is encrypted to generate a packaged secure cloud workload using the cryptographically generated unique packaging key. The encrypted secure cloud workload is transmitted to the edge device. The edge device is capable of independently cryptographically generating the unique packaging key using the unique device identifier, the unique workload identifier, and the nonce. The edge device is also capable of decrypting the packaged secure cloud workload using the generated unique packaging key cryptographically generated by the edge device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

When a workload is executed on an edge device instead of in the cloud, the execution of the workload may be faster, partially because an internet connection may not be required. However, it is often less secure to execute a workload on an edge device, because the edge device may be more susceptible to corruption or unauthorized entry. Using a unique packaging key that is separately generated at both a workload provisioning service and at the edge device makes execution of workloads on edge devices more secure.

Figure 1:
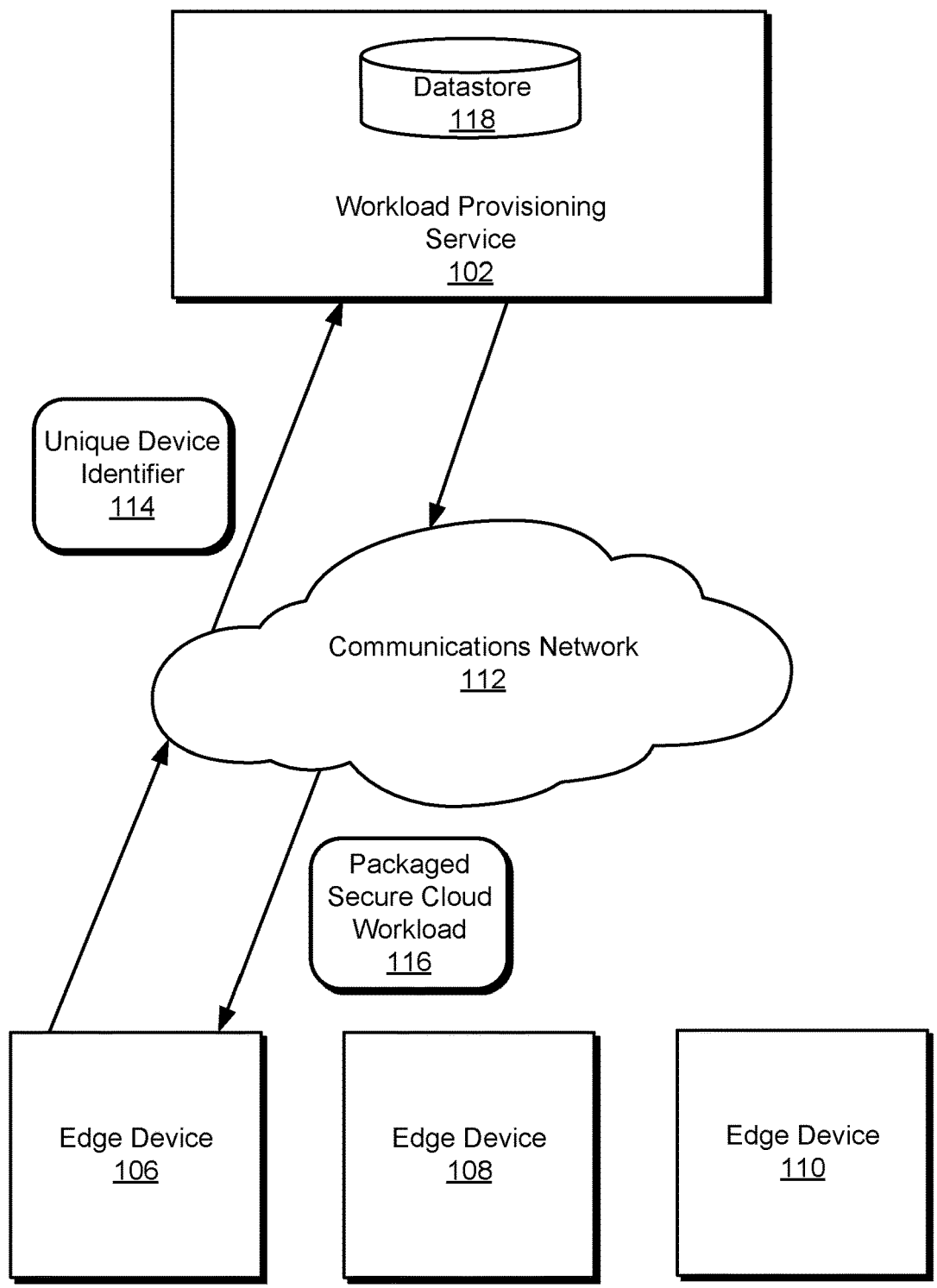
FIG. 1 illustrates an example workload provisioning service in communication with edge devices through a communications network.

FIG. 1 illustrates an example workload provisioning service hardware 102 in communication with edge devices 106, 108, and 110 through a communications network 112. Generally, the workload provisioning service hardware 102 is comprised of one or more workload provisioning servers and includes a datastore 118 including workloads for various edge devices, such as the edge devices 106, 108, and 110. A workload may include any discrete task to be performed by an edge device. An edge device may be a device connected to the internet of things (IoT).

The workload provisioning service hardware 102 may send workloads to any of the edge devices 106, 108, or 110 through the communications network 112. Some workloads may include sensitive, confidential, or otherwise restricted data that may be encrypted before being sent over the communications network 112. The workload provisioning service hardware 102 may encrypt and package the workload before sending it to an edge device (i.e., the edge device 106. The workload is encrypted using a unique packaging key unique to the workload and the device. The unique packaging key is generated by the workload provisioning service hardware 102. The encrypted workload is communicated to the edge device 106. The edge device 106 separately generates the unique packaging key to decrypt the workload before execution of the workload.

The edge device 106 communicates a unique device identifier 114 to the workload provisioning service hardware 102 using the communications network 112. The edge device 106 may communicate the unique device identifier 114 in response to a request from the workload provisioning service hardware 102 or as part of a request from the edge device 106 to the workload provisioning service hardware 102. The unique device identifier 114 may be a unique string of characters corresponding to the edge device 106.

The workload provisioning service hardware 102 uses the unique device identifier 114 along with a unique workload identifier and a nonce to generate the unique packaging key. The unique workload identifier corresponds to the workload. The nonce may be generated by the workload provisioning service hardware 102 or may be requested by the workload provisioning service. The workload provisioning service hardware 102 uses the unique packaging key to encrypt the secure cloud workload to generate a packaged secure cloud workload 116.

Figure 2:
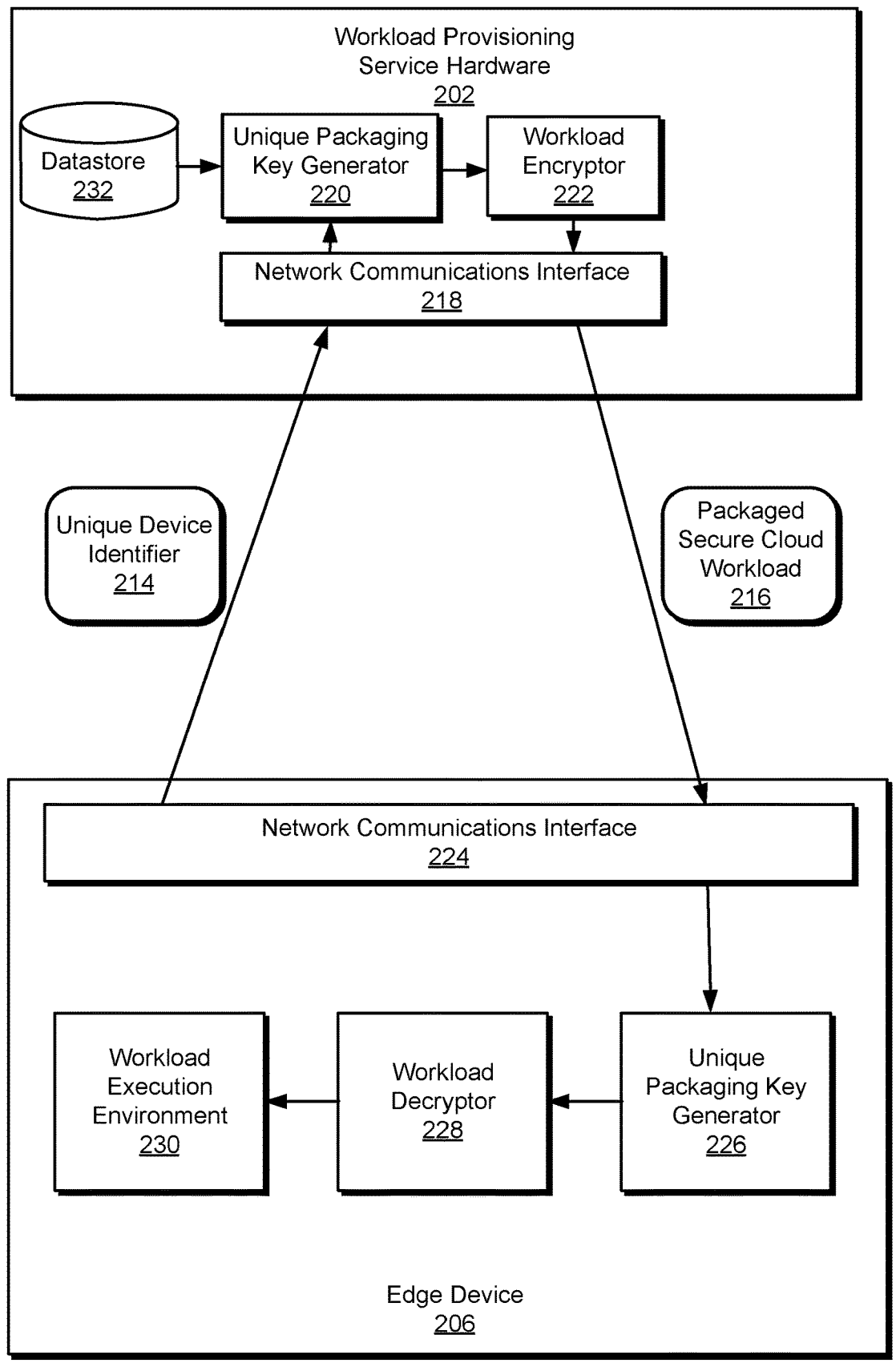
FIG. 2 illustrates an example workload provisioning service delivering an encrypted secure cloud workload to an edge device.

FIG. 2 illustrates an example workload provisioning service 202 delivering an encrypted secure cloud workload 216 to an edge device 206. The workload provisioning service 202 includes at least a network communications interface 218, a unique packaging key generator 220, a workload encryptor 222, and a datastore 232.

The network communications interface 218 receives a unique device identifier 214 from the edge device 206. In some implementations, the edge device 206 may communicate the unique device identifier 214 to the workload provisioning service 202 in response to a request from the workload provisioning service 202. In other implementations, the edge device 206 may communicate the unique device identifier 214 to the workload provisioning service 202 as part of a request by the edge device 206 for a workload from the workload provisioning service 202.

The unique device identifier 214 is communicated to the unique packaging key generator 220. The unique packaging key generator 220 generates a unique packaging key corresponding to the secure cloud workload and to the edge device 206 using the unique device identifier 214, a unique workload identifier corresponding to the secure cloud workload to be communicated to the edge device 206, and a nonce. The nonce may be generated by a nonce generator located on the workload provisioning service 202 on the datastore 232 or may be retrieved by the workload provisioning service 202 via a communications network.

The generated unique packaging key is used by the workload encryptor 222 to encrypt the secure cloud workload to be sent to the edge device 206. The secure cloud workload may be stored on a datastore located on the workload provisioning service 202 accessible by the workload encryptor 222, along with other secure cloud workloads for various edge devices. In some implementations, the secure cloud workload may be stored in another location communicatively connected to the workload provisioning service 202.

Along with encrypting the secure cloud workload, the workload encryptor 222 may, in some implementations, further package the secure cloud workload for communication to the edge device 206. For example, the workload encryptor 222 may, in some implementations, package the nonce for communication with the encrypted secure cloud workload as a single package. The workload encryptor 222 then communicates a packaged secure cloud workload 216 to the edge device 206 by communicating the packaged secure cloud workload 216 to the network communications interface 218. The network communications interface 218 communicates the packaged secure cloud workload 216 to the edge device 206 over a communications network.

The edge device 206 receives the packaged secure cloud workload 216 at a network communications interface 224. The network communications interface 224 communicates the packaged secure cloud workload 216 to a unique packaging key generator 226 on the edge device 206. The unique packaging key generator 226 cryptographically generates the unique packaging key using the unique device identifier, the unique workload identifier, and the nonce. The unique workload identifier may be communicated in a package with the packaged secure cloud workload 216. In some implementations, the nonce may also be communicated in the package with the packaged secure cloud workload 216. In other implementations, the nonce may be separately received by the edge device 206 from the workload provisioning service 202.

The unique packaging key generator 226 communicates the packaged secure cloud workload 216 and the generated unique packaging key to a workload decryptor 228. In some implementations, the workload decryptor 228 may be a trusted platform module (TPM) or part of a trusted execution environment (TEE) so that the unique packaging key is protected in a secure enclave. The workload decryptor 228 uses the generated unique packaging key to decrypt the secure cloud workload. The workload decryptor 228 then communicates the secure cloud workload to a workload execution environment 330. When the workload decryptor 228 is a TPM, the workload decryptor 228 communicates the secure cloud workload to the workload execution environment 230 outside of the secure enclave of the TPM.

When the workload decryptor 228 is part of a TEE, the workload execution environment 230 may be either fully or partially within the secure enclave. In some implementations, the workload execution environment 230 may be located partially within the secure enclave of the TEE. When the workload execution environment 230 is located partially within the secure enclave of the TEE, portions of the secure cloud workload requiring sensitive information or data may be executed within the secure enclave, while the remainder of the workload may be executed in a less secure portion of the workload execution environment 230.

Figure 3:
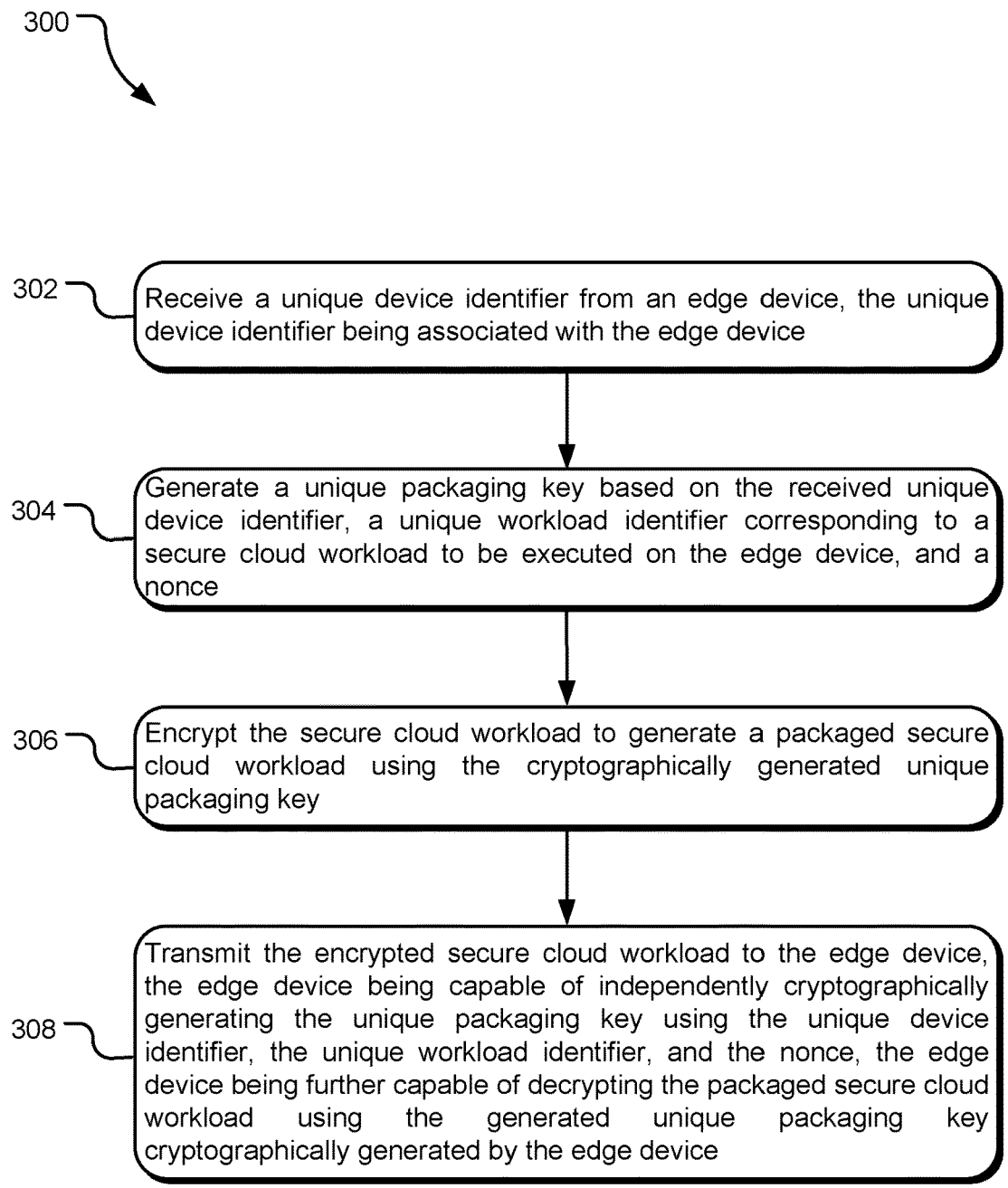
FIG. 3 illustrates example operations for generating an encrypted secure cloud workload for an edge device at a workload provisioning service.

FIG. 3 illustrates example operations 300 for generating an encrypted secure cloud workload for an edge device at a workload provisioning service. A receiving operation 302 receives a unique device identifier from an edge device. The unique device identifier is associated with the edge device. In some implementations, the edge device may send the unique device identifier to the workload provisioning service in response to a request from the workload provisioning service. In other implementations, the edge device may send the unique device identifier to the workload provisioning service as part of a request for a workload from the edge device to the workload provisioning service.

A generating operation 304 cryptographically generates a unique packaging key based on the received unique device identifier, a unique workload identifier corresponding to a secure cloud workload to be executed on the edge device, and a nonce. The nonce may be generated by a nonce generator that is part of the workload provisioning service. Alternatively, the workload provisioning service may receive the nonce from a nonce generator through a communications network. The nonce is unique to the generation of the unique packaging key for the secure cloud workload on the edge device. The unique workload identifier corresponds to the secure cloud workload and may, in some implementations, be retrieved from a datastore located on the workload provisioning service. In other implementations, the unique workload identifier may be stored at another location and retrieved by the workload provisioning service via a communications network.

An encrypting operation 306 encrypts the secure cloud workload to generate a packaged secure cloud workload using the cryptographically generated unique packaging key. In some implementations, encrypting the secure cloud workload may include further packaging the secure cloud workload for communication to the edge device. For example, in some implementations, the nonce may be packaged for communication with the packaged secure cloud workload as a single package.

A transmitting operation 308 transmits the packaged secure cloud workload to the edge device. The edge device is capable of independently cryptographically generating the unique packaging key using the unique device identifier, the unique workload identifier, and the nonce. The edge device is also capable of decrypting the packaged secure cloud workload using the generated unique packaging key cryptographically generated by the edge device. The packaged secure cloud workload is transmitted over a communications network and sent from a network communications interface of the workload provisioning service to a network communications interface of the edge device.

Figure 4:
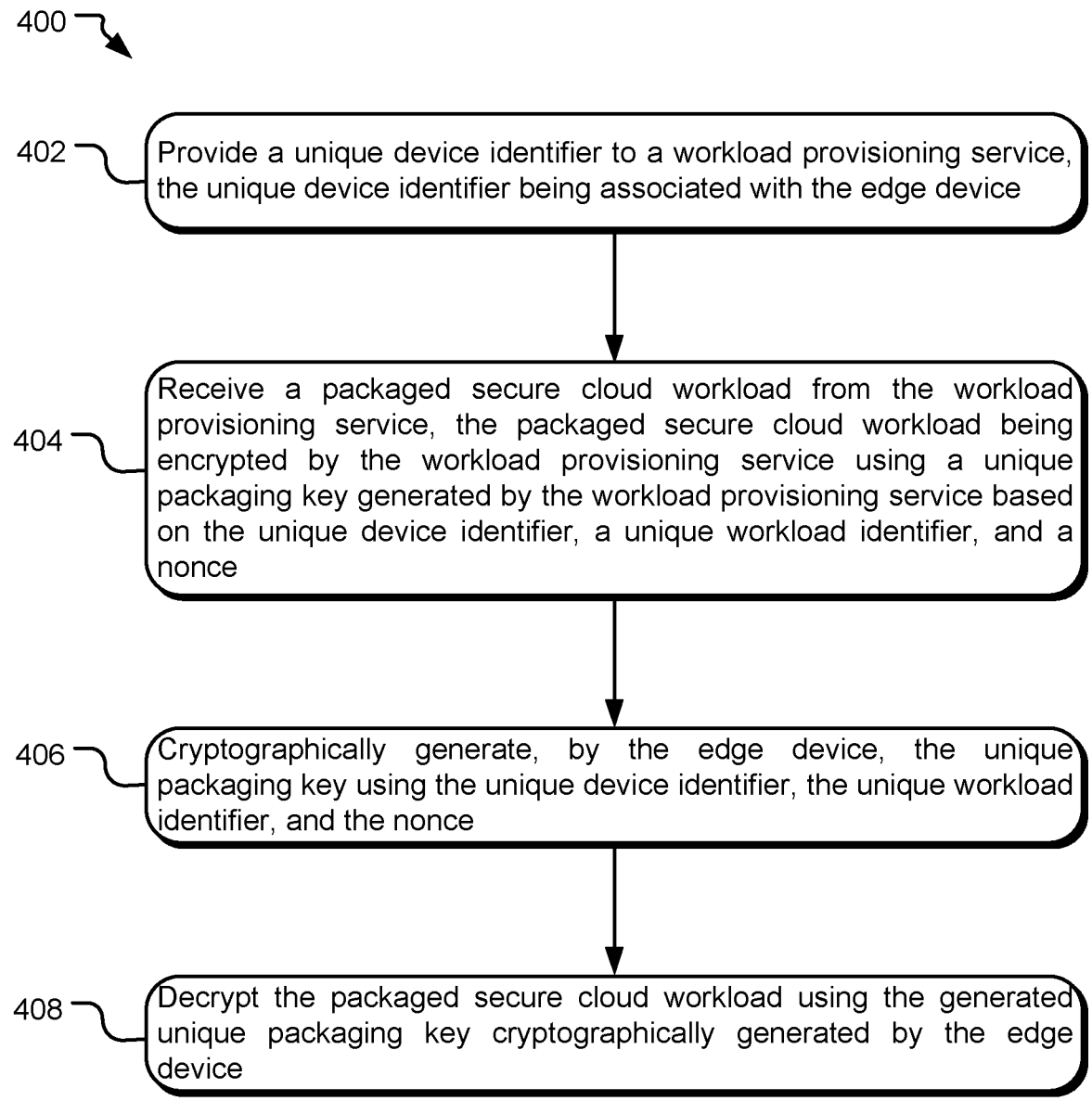
FIG. 4 illustrates example operations for receiving and processing a secure cloud workload received from a workload provisioning service at an edge device.

FIG. 4 illustrates example operations 400 for receiving and processing a secure cloud workload received from a workload provisioning service at an edge device. A providing operation 402 provides a unique device identifier to a workload provisioning service. The unique device identifier is associated with the edge device. The unique device identifier may be provided to the workload provisioning service in response to a request from the workload provisioning service. The unique device identifier may also be provided to the workload provisioning service as part of a request from the edge device to the workload provisioning service for a particular workload.

A receiving operation 404 receives a packaged secure cloud workload from the workload provisioning service. The packaged secure cloud workload is encrypted by the workload provisioning service using a unique packaging key generated by the workload provisioning service based on the unique device identifier, a unique workload identifier, and a nonce. In some implementations, the packaged secure cloud workload may include other information, including the nonce and unique workload identifier.

A generating operation 406 cryptographically generates, by the edge device, the unique packaging key using the unique device identifier, the unique workload identifier, and the nonce. The unique workload identifier may be communicated in a package with the packaged secure cloud workload. In some implementations, the nonce may also be communicated in the package with the packaged secure cloud workload. In other implementations, the nonce may be separately received by the edge device from the workload provisioning service.

A decrypting operation 408 decrypts the packaged secure cloud workload using the cryptographically generated unique packaging key cryptographically generated by the edge device. The decrypting operation 408 may occur at a workload decryptor of the edge device. In some implementations, the workload decryptor may be a trusted platform module (TPM) or part of a trusted execution environment (TEE) so that the unique packaging key is protected in a secure enclave. The workload decryptor uses the generated unique packaging key to decrypt the secure cloud workload.

When the workload decryptor is a TPM, the workload decryptor communicates the secure cloud workload to a workload execution environment outside of the secure enclave of the TPM. When the workload decryptor is part of a TEE, the workload may be executed either wholly or partially within the secure enclave of the TEE.

Figure 5:
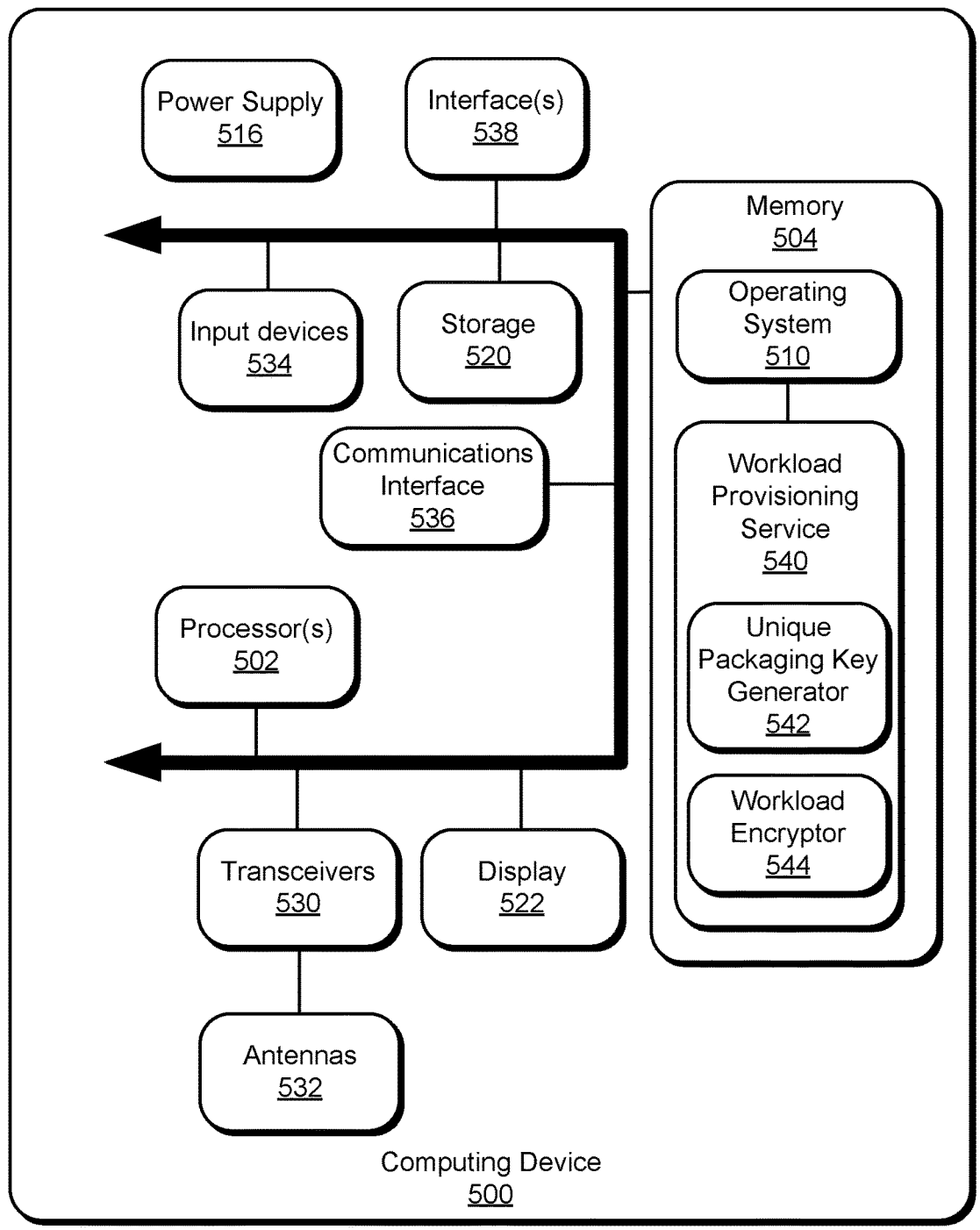
FIG. 5 illustrates an example computing device for use in generating an encrypted secure cloud workload.

FIG. 5 illustrates an example computing device for use in generating an encrypted secure cloud workload. The example computing device 500 may be used to generate a packaged secure cloud workload for processing by an edge device. The computing device 500 may be a client device, such as a laptop, mobile device, desktop, tablet, or a server/cloud device. The computing device 500 includes one or more processor(s) 502, and a memory 504. The memory 504 generally includes both volatile memory (e.g., RAM) and non-volatile memory (e.g., flash memory). An operating system 510 resides in the memory 504 and is executed by the processor(s) 502.

One or more modules or segments, such as a workload provisioning service 540 are loaded into the operating system 510 on the memory 504 and/or storage 520 and executed by the processor(s) 502. The modules may include the workload provisioning service 540 implemented by a unique packaging key generator 542 and a workload encryptor 544. The unique packaging key generator 542 cryptographically generates a unique packaging key for encrypting a secure cloud workload. The workload encryptor 544 uses the generated unique packaging key to encrypt a secure cloud workload for communication to an edge device. The storage 520 may be local to the computing device 500 or may be remote and communicatively connected to the computing device 500 and may include another server. The storage 520 may store resources that are requestable by client devices (not shown).

The computing device 500 includes a power supply 516, which is powered by one or more batteries or other power sources and which provides power to other components of the computing device 500. The power supply 516 may also be connected to an external power source that overrides or recharges the built-in batteries or other power sources.

The computing device 500 may include one or more communication transceivers 530 which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a network adapter 536, which is a type of communication device. The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538 such as a serial port interface, parallel port, or universal serial bus (USB). The computing device 500 may further include a display 522 such as a touch screen display.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Figure 6:
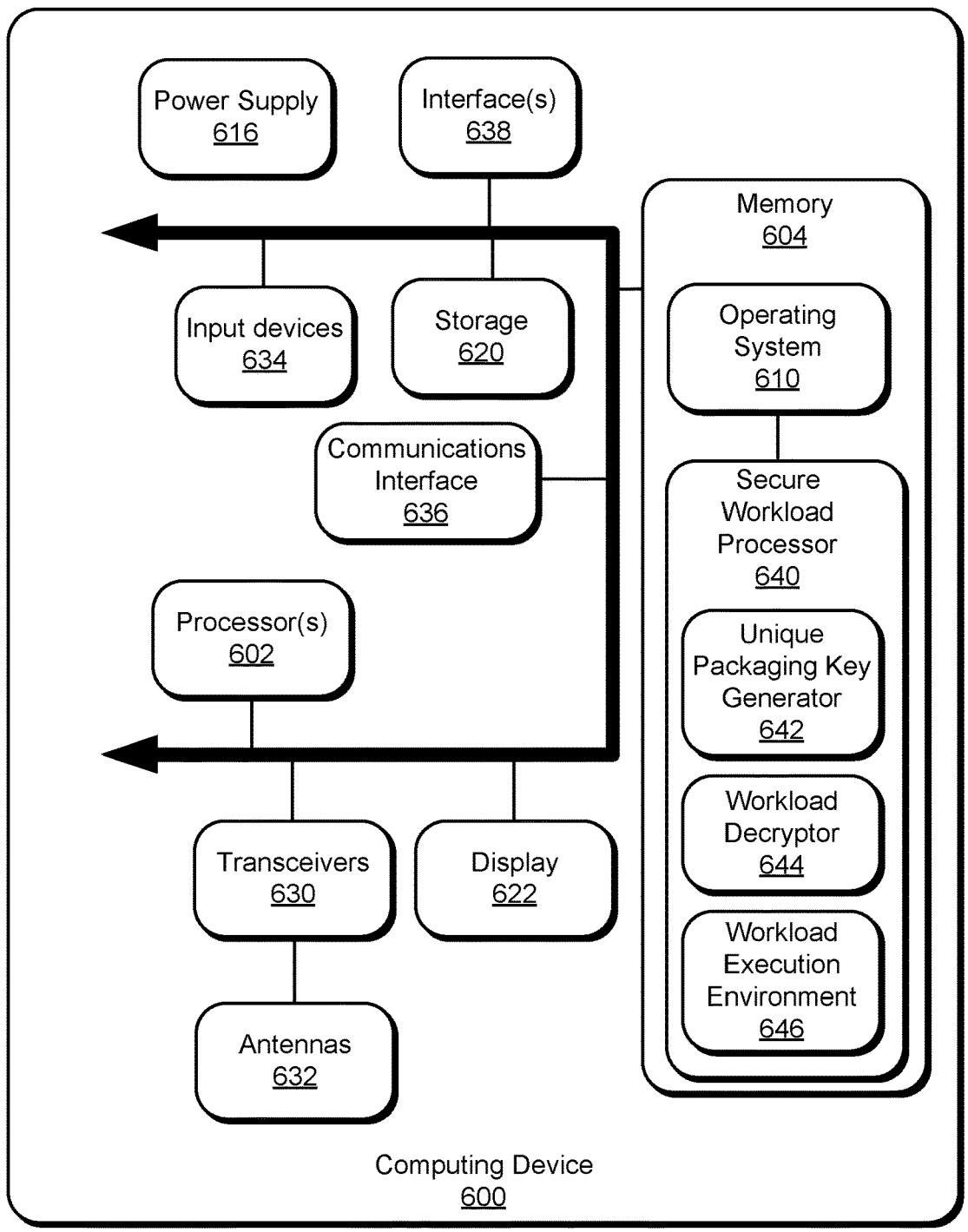
FIG. 6 illustrates an example computing device for use in processing an encrypted secure cloud workload.

FIG. 6 illustrates an example computing device for use in processing an encrypted secure cloud workload. The example computing device 600 may be used to process a packaged secure cloud workload received from a workload provisioning service. The computing device 600 may be a client device, such as a laptop, mobile device, desktop, tablet, or a server/cloud device. The computing device 600 includes one or more processor(s) 602, and a memory 604. The memory 604 generally includes both volatile memory (e.g., RAM) and non-volatile memory (e.g., flash memory). An operating system 610 resides in the memory 604 and is executed by the processor(s) 602.

One or more modules or segments, such as a secure workload processor 640 are loaded into the operating system 610 on the memory 604 and/or storage 620 and executed by the processor(s) 602. The modules may include the secure workload processor 640 implemented by a unique packaging key generator 642, a workload decryptor 644, and a workload execution environment 646. The storage 620 may be local to the computing device 600 or may be remote and communicatively connected to the computing device 600 and may include another server. The storage 620 may store resources that are requestable by client devices (not shown).

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630 which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of communication device. The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638 such as a serial port interface, parallel port, or universal serial bus (USB). The computing device 600 may further include a display 622 such as a touch screen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example method of securely deploying, to an edge device, a secure cloud workload with a workload identifier uniquely identifying the secure cloud workload from a workload provisioning service including one or more workload provisioning servers is provided. The method includes receiving, at the one or more workload provisioning servers, a device identifier uniquely identifying the edge device and cryptographically generating, by the one or more workload provisioning servers, a unique packaging key based on the received device identifier, the workload identifier, and a nonce. The method further includes encrypting, by the one or more workload provisioning servers, the secure cloud workload to generate a packaged secure cloud workload using the cryptographically generated unique packaging key. The method also includes transmitting, from the one or more workload provisioning servers, the packaged secure cloud workload to the edge device, the edge device being configured to independently cryptographically generate the unique packaging key using the device identifier, the workload identifier, and the nonce, the edge device being further configured to decrypt the packaged secure cloud workload using the generated unique packaging key cryptographically generated by the edge device.

A method of any previous method is provided, where the nonce is generated by the one or more workload provisioning servers.

A method of any previous method is provided, where the method also includes transmitting the nonce from the one or more workload provisioning servers to the edge device as part of the packaged secure cloud workload.

A method of any previous method is provided, where the method also includes transmitting the nonce from the one or more workload provisioning servers to the edge device separately from the packaged secure cloud workload.

A method of any previous method is provided, where the secure cloud workload is configured to be executed by the edge device.

A method of any previous method is provided, where the secure cloud workload is configured to be executed by the edge device in a trusted execution environment.

A method of any previous method is provided, where the generated unique packaging key is configured to be stored in a trusted platform module and the secure cloud workload is configured to be executed outside of the trusted platform module.

An example system for securely deploying, to an edge device, a secure cloud workload with a workload identifier uniquely identifying the secure cloud workload form a workload provisioning service including one or more workload provisioning servers is provided. The system includes means for receiving, at the one or more workload provisioning servers, a device identifier uniquely identifying the edge device and for cryptographically generating, by the one or more workload provisioning servers, a unique packaging key based on the received device identifier, the workload identifier, and a nonce. The system also includes means for encrypting, by the one or more workload provisioning servers, the secure cloud workload to generate a packaged secure cloud workload using the cryptographically generated unique packaging key. The system also includes means for transmitting, from the one or more workload provisioning servers, the packaged secure cloud workload to the edge device, the edge device being configured to independently cryptographically generate the unique packaging key using the device identifier, the workload identifier, and the nonce, the edge device being further configured to decrypt the packaged secure cloud workload using the generated unique packaging key cryptographically generated by the edge device.

An example system of any previous system is provided, where the nonce is generated by the one or more workload provisioning servers.

An example system of any previous system further includes means for transmitting the nonce form the one or more workload provisioning servers to the edge device as part of the packaged secure cloud workload.

An example system of any previous system further includes means for transmitting the nonce from the one or more workload provisioning servers to the edge device separately from the packaged secure cloud workload.

An example system of any previous system is provided, where the secure cloud workload is configured to be executed by the edge device.

An example system of any previous system is provided, where the secure cloud workload is configured to be executed by the edge device in a trusted execution environment.

An example system of any previous system is provided, where the generated unique packaging key is configured to be stored in a trusted platform module and the secure cloud workload is configured to be executed outside of the trusted platform module.

An example computing device for securely deploying, to an edge device, a secure cloud workload with a workload identifier uniquely identifying the secure cloud workload from a workload provisioning service including one or more workload provisioning servers is provided. The computing device includes a unique packaging key generator configured receive a device identifier uniquely identifying the edge device and to cryptographically generate a unique packaging key based on the received device identifier, the workload identifier, and a nonce. The computing device further includes a workload encryptor configured to encrypt the secure cloud workload to generate a packaged secure cloud workload using the cryptographically generated unique packaging key. The computing device also includes a network communications interface configured to transmit the packaged secure cloud workload to the edge device, the edge device being configured to independently cryptographically generate the unique packaging key using the device identifier, the workload identifier, and the nonce, the edge device being further configured to decrypt the packaged secure cloud workload using the generated unique packaging key cryptographically generated by the edge device.

An example computing system of any previous computing system is provided, where the network communications interface is further configured to transmit the nonce to the edge device.

An example computing system of any previous computing system is provided, where the network communications interface transmits the nonce to the edge device as part of the packaged secure cloud workload.

An example computing system of any previous computing system is provided, where the network communications interface transmits the nonce to the edge device separately from the packaged secure cloud workload.

An example computing system of any previous computing system is provided, where the secure cloud workload is configured to be executed by the edge device.

An example computing system of any previous computing system is provided, where the secure cloud workload is configured to be executed by the edge device is a trusted execution environment.

An example computing system of any previous computing system is provided, where the generated unique packaging key is configured to be stored in a trusted platform module and the secure cloud workload is configured to be executed outside of the trusted platform module.

Example one or more tangible processor-readable storage media are embodied with instructions for executing on one or more processors and circuits of a computing device a process for securely deploying, to an edge device, a secure cloud workload with a workload identifier uniquely identifying the secure cloud workload from a workload provisioning service including one or more workload provisioning servers. The process includes receiving, at the one or more workload provisioning servers, a device identifier uniquely identifying the edge device and cryptographically generating, by the one or more workload provisioning servers, a unique packaging key based on the received device identifier, the workload identifier, and a nonce. The process also includes encrypting, by the one or more workload provisioning servers, the packaged secure cloud workload to the edge device, the edge device being configured to independently cryptographically generate the unique packaging key using the device identifier, the workload identifier, and the nonce. The edge device is further configured to decrypt the packaged secure cloud workload using the generated unique packaging key cryptographically generated by the edge device.

Another example one or more tangible processor-readable storage media are embodied with instructions for executing on one or more processors and circuits of a device a process of any preceding process, further including transmitting the nonce from the one or more workload provisioning servers to the edge device as part of the packaged secure cloud workload.

Another example one or more tangible processor-readable storage media are embodied with instructions for executing on one or more processors and circuits of a device a process of any preceding process, further including transmitting the nonce from the one or more workload provisioning servers to the edge device separately from the packaged secure cloud workload.

Another example one or more tangible processor-readable storage media are embodied with instructions for executing on one or more processors and circuits of a device a process of any preceding process, where the secure cloud workload is configured to be executed by the edge device.

Another example one or more tangible processor-readable storage media are embodied with instructions for executing on one or more processors and circuits of a device a process of any preceding process, where the secure cloud workload is configured to be executed by the edge device in a trusted execution environment.

Another example one or more tangible processor-readable storage media are embodied with instructions for executing on one or more processors and circuits of a device a process of any preceding process, where the generated unique packaging key is configured to be stored in a trusted platform module and the secure cloud workload is configured to be executed outside of the trusted platform module.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of securely deploying, to a computing device, a secure workload with a workload identifier uniquely identifying the secure workload of a workload provisioning service including one or more workload provisioning servers, the method comprising:
cryptographically generating, by the one or more workload provisioning servers, a unique packaging key based on a device identifier, the workload identifier, and a nonce, wherein the device identifier uniquely identifies the computing device relative to other computing devices capable of executing a workload deployed from the one or more workload provisioning server;
encrypting, by the one or more workload provisioning servers, the secure workload to generate a packaged secure workload using the cryptographically generated unique packaging key; and
transmitting, from the one or more workload provisioning servers, the packaged secure workload to the computing device, the computing device being configured to independently cryptographically generate the unique packaging key using the device identifier, the workload identifier, and the nonce, the computing device being further configured to decrypt the packaged secure workload using the unique packaging key cryptographically generated by the computing device.

2. The method of claim 1, wherein the nonce is generated by the one or more workload provisioning servers.

3. The method of claim 1, further comprising:
transmitting the nonce from the one or more workload provisioning servers to the computing device as part of the packaged secure workload.

4. The method of claim 1, further comprising:
transmitting the nonce from the one or more workload provisioning servers to the computing device separately from the packaged secure workload.

5. The method of claim 1, wherein the secure workload is configured to be executed by the computing device.

6. The method of claim 5, wherein the secure workload is configured to be executed by the computing device in a trusted execution environment.

7. The method of claim 5, wherein the unique packaging key generated by the computing device is configured to be stored in a trusted platform module and the secure workload is configured to be executed outside of the trusted platform module.

8. A system for securely deploying, to a computing device, a secure workload with a workload identifier uniquely identifying the secure workload from a workload provisioning service including one or more workload provisioning servers, the system comprising:
one or more hardware processors;
a unique packaging key generator executable by the one or more hardware processors and configured to cryptographically generate a unique packaging key based on a device identifier, the workload identifier, and a nonce wherein the device identifier uniquely identifies the computing device relative to other computing devices capable of executing a workload deployed from the one or more workload provisioning server;
a workload encryptor executable by the one or more hardware processors and configured to encrypt the secure workload to generate a packaged secure workload using the cryptographically generated unique packaging key; and
a network communications interface configured to transmit the packaged secure workload to the computing device, the computing device being configured to independently cryptographically generate the unique packaging key using the device identifier, the workload identifier, and the nonce, the computing device being further configured to decrypt the packaged secure workload using the unique packaging key cryptographically generated by the computing device to be executed by the computing device.

9. The system of claim 8, wherein the network communications interface is further configured to transmit the nonce to the computing device.

10. The system of claim 9, wherein the network communications interface transmits the nonce to the computing device as part of the packaged secure workload.

11. The system of claim 9, wherein the network communications interface transmits the nonce to the computing device separately from the packaged secure workload.

12. The system of claim 8, wherein the secure workload is configured to be executed by the computing device.

13. The system of claim 12, wherein the secure workload is configured to be executed by the computing device in a trusted execution environment.

14. The system of claim 12, wherein the unique packaging key generated by the computing device is configured to be stored in a trusted platform module and the secure workload is configured to be executed outside of the trusted platform module.

15. One or more tangible processor-readable storage media embodied with instructions for executing on one or more processors and circuits of a computing system a process for securely deploying, to a computing device, a secure workload with a workload identifier uniquely identifying the secure workload from a workload provisioning service including one or more workload provisioning servers, the process comprising:
cryptographically generating, by the one or more workload provisioning servers, a unique packaging key based on a device identifier, the workload identifier, and a nonce, wherein the device identifier uniquely identifies the computing device relative to other computing devices capable of executing a workload deployed from the one or more workload provisioning server;
encrypting, by the one or more workload provisioning servers, the secure workload to generate a packaged secure workload using the cryptographically generated unique packaging key; and
transmitting, from the one or more workload provisioning servers, the packaged secure workload to the computing device, the computing device being configured to independently cryptographically generate the unique packaging key using the device identifier, the workload identifier, and the nonce, the computing device being further configured to decrypt the packaged secure workload using the unique packaging key cryptographically generated by the computing device.

16. The one or more tangible processor-readable storage media of claim 15, wherein the process further comprises:
transmitting the nonce from the one or more workload provisioning servers to the computing device as part of the packaged secure workload.

17. The one or more tangible processor-readable storage media of claim 15, wherein the process further comprises:
transmitting the nonce from the one or more workload provisioning servers to the computing device separately from the packaged secure workload.

18. The one or more tangible processor-readable storage media of claim 15, wherein the secure workload is configured to be executed by the computing device.

19. The one or more tangible processor-readable storage media of claim 18, wherein the secure workload is configured to be executed by the computing device in a trusted execution environment.

20. The one or more tangible processor-readable storage media of claim 18, wherein the unique packaging key generated by the computing device is configured to be stored in a trusted platform module and the secure workload is configured to be executed outside of the trusted platform module.

* * * * *